US012705028B2

(12) United States Patent
Chenevier et al.

(10) Patent No.: US 12,705,028 B2
(45) Date of Patent: Aug. 11, 2026

(54) METHOD FOR AUTOMATICALLY GENERATING A SEQUENCE OF NMAX INSTRUCTIONS IN ASSEMBLY LANGUAGE, THE SEQUENCE BEING EXECUTABLE ERROR-FREE BY A MULTI-CORE PROCESSOR

(71) Applicant: THALES, Meudon (FR)

(72) Inventors: Florent Chenevier, Toulouse (FR); Florence De Grancey, Toulouse (FR); Joshua Salort, Toulouse (FR)

(73) Assignee: THALES, Meudon (FR)

( * ) Notice: Subject to any disclaimer, the term of this patent is extended or adjusted under 35 U.S.C. 154(b) by 261 days.

(21) Appl. No.: 18/597,822

(22) Filed: Mar. 6, 2024

(65) Prior Publication Data

US 2024/0311091 A1 Sep. 19, 2024

(30) Foreign Application Priority Data

Mar. 17, 2023 (FR) ...................................... 2302516

(51) Int. Cl.
*G06F 8/30* (2018.01)

(52) U.S. Cl.
CPC ..................................... *G06F 8/31* (2013.01)

(58) Field of Classification Search
CPC .......... G06F 8/30; G06F 8/31; G06F 11/3684; G06F 11/3688
See application file for complete search history.

(56) References Cited

U.S. PATENT DOCUMENTS 9,696,966 B2 * 7/2017 Edwards ............... G06F 8/4441
9,710,366 B2 * 7/2017 Luan .................. G06F 11/3692
11,726,671 B2 * 8/2023 Hu ....................... G06F 3/0622 711/163
2002/0089882 A1 * 7/2002 Chen ....................... G11C 8/12 365/200
2016/0239212 A1 8/2016 Solihin et al.

OTHER PUBLICATIONS

Courtaud, et al., "Improving Prediction Accuracy of Memory Interferences for Multicore Platforms", 2019 IEEE Real-Time Systems Symposium (RTSS), pp. 246-259, 2019.
Iorga, et al., "Slow and Steady: Measuring and Tuning Multicore Interference", 2020 IEEE Real-Time and Embedded Technology and Applications Symposium (RTAS), pp. 200-212, 2020.

* cited by examiner

*Primary Examiner* — Marina Lee
(74) *Attorney, Agent, or Firm* — BakerHostetler

(57) ABSTRACT

A method for automatically generating a sequence of Nmax instructions in assembly language, the sequence being executable error-free by a multi-core processor, the method comprising steps of: initializing registers of the processor, then selecting a first instruction of the predetermined sequence, optionally at random; and selecting an N+1$^{th}$ instruction among an instruction to read from a memory connected to the cores of the processor by a memory bus, an instruction to write to said memory, and a local instruction using only the registers of the processors, according to rules and to priorities between the rules, the rules using respective differences between statistical-metric values of statistical metrics of a memory access pattern of the sequence of N previous instructions having statistical-metric values, and setpoint values.

8 Claims, 4 Drawing Sheets

METHOD FOR AUTOMATICALLY GENERATING A SEQUENCE OF NMAX INSTRUCTIONS IN ASSEMBLY LANGUAGE, THE SEQUENCE BEING EXECUTABLE ERROR-FREE BY A MULTI-CORE PROCESSOR

CROSS-REFERENCE TO RELATED APPLICATION

This application claims priority to foreign French patent application No. FR 2302516, filed on Mar. 17, 2023, the disclosure of which is incorporated by reference in its entirety.

FIELD OF THE INVENTION

The invention relates to a method for automatically generating a sequence of Nmax instructions in assembly language, the sequence being executable error-free by a multi-core processor.

BACKGROUND

The technical field of the invention is that of software in general and more particularly that of generation of stubs. A stub is a software module that at least simulates the presence of another. In the case of more sophisticated imitation, in particular simulating a number of functional exchanges, the term simulators or models is employed. The present invention is limited to simulation of the impact of execution of software on the activity on a memory bus, and it is not sought to simulate the functional aspect of the application.

The invention also relates to test of the performance of embedded software (worst case execution time or WCET) and analysis of the problem of multi-core or processor memory contention or interference and of the behaviour of software with regard thereto: the notions of aggressiveness and sensitivity in particular.

The present invention is a means for automatically and rapidly generating stubs having targeted characteristics and controlled behaviour with respect to memory contention.

Currently, to construct a stub, a code sequence is generated by a programmer, in assembly language or in a high-level language, and it is executed in a loop.

It is known for software engineers to generate a code sequence in an assembly machine language or in a high-level language such as C, the sequence being executed in a loop. The characteristics of this sequence are determined through analysis by a software engineer, based on his or her assembly-code expertise and the impact of each instruction on memory contention.

Such “manual” construction of an assembly-language code sequence is subject to the intrinsic limitations of a manual activity of this type, such as the long time required to produce sequences of large size (several tens of minutes or thereabouts, or even several hours to construct a sequence of several thousand assembly-language instructions), or such as the high level of skill required to secure on-target execution of each sequence as compliance with constraints related to each instruction (operand value, memory address, register management) is required.

Therefore, the size of manually constructed sequences is often limited to a few instructions (at most a few dozen). However, the size of the generated sequences is an important factor in obtaining a wide variety of memory access patterns (sequences of a few dozen instructions will end up having similar patterns).

It is also known to construct a code sequence automatically, for example by randomly selecting instructions from the dictionary of instructions of the microprocessor.

Automatically constructing sequences of several hundred instructions by drawing randomly from the dictionary of instructions of the microprocessor amounts to making multiple successive random draws, and therefore the law of large numbers applies.

Thus, sequences of instructions are obtained that are statistically very similar, and that reflect the statistical distribution in the dictionary of read and write instructions R, W and of local instructions (i.e. instructions working only on registers), as well as an average Shannon entropy E.

As a result, it is currently very difficult to rapidly construct sequences of instruction with varied and precisely chosen characteristics, whether with a view to forming therefrom a training database of several thousand items or to constructing a single stub with chosen characteristics.

Often, the behaviour of such sequences with respect to memory contention is difficult to anticipate: it is difficult to quantify their propensity to generate and/or experience memory contention (called their aggressiveness and their sensitivity, respectively).

When multi-core microprocessors are used, a plurality of resources may be shared by various software packages running in parallel on the various cores. In particular, random access memory (RAM) is accessible via a bus common to all the cores.

Like any shared resource, this bus is managed by a controller that manages simultaneous and concurrent requests for access according to its own arbitration logic, causing one or other of the software packages running on the various cores to slow down.

Depending on the activity of these software packages and above all on the way in which they access the memory (their so-called “memory access pattern”), slowdown of their execution therefore occurs (as a result of the need to wait during execution of assembly-language instructions accessing memory, in case of concurrent access). This slowdown depends:

- on the arbitration logic of the memory bus controller,
- on the memory access pattern of the software, and
- on the patterns of software packages running in parallel on other cores.

This effect is known as memory contention or interference.

In the context of critical embedded software, it is necessary (and sometimes required by certification authorities) to provide the worst case execution time (WCET) of the software, in order to verify that it will indeed be able to run in the allocated time.

This characterization, which is already difficult for complex software run on single-core microprocessors, becomes even more problematic on multi-core microprocessors, because of the effect of contention, which affects all the software running in parallel.

The notions of aggressiveness, or propensity to generate memory contention, and of sensitivity, or propensity to experience memory contention, are defined by measurement with respect to reference applications, and to this end:

- a sensitive reference application is constructed, the latter executing a loop of assembly-language instructions identified, by analysis, as being of lower priority in the arbitration mechanisms of the memory bus (a counter is incremented on each execution of the loop), and an aggressive reference application is constructed on the same principle with an instruction loop among those of highest priority.

To measure the aggressiveness and sensitivity of an assembly-language code sequence, it is executed in a loop for a given period of time in the following configurations:

execution of the sensitive application alone: the number of loops executed in the period is recorded;

execution of the sequence alone: the number of loops executed in the period is recorded;

execution of the sequence in parallel with the sensitive application: the slowdown of the sensitive application when executed in parallel with the code sequence, with respect to when it was executed alone, is measured;

execution of the sequence in parallel with the aggressive application: the slowdown of the tested sequence when executed in parallel with the aggressive application, with respect to when it was executed alone, is measured.

Aggressiveness, as illustrated in FIG. 1, is the ratio of the number of loops executed by the sensitive reference application in a given period of time when executed alone and in parallel with the sequence under test.

Aggressiveness, as illustrated in FIG. 2, is the ratio of the number of loops executed by the aggressive reference application in a given period of time when executed alone and in parallel with the sequence under test.

Sensitivity and aggressiveness are ratios and are therefore expressed as percentages.

Since the effect of memory contention or interference is intrinsically related to the demands placed on the memory bus by software, it is sought to characterize these demands.

To do this, it is known to define a memory access pattern P of an assembly-language code sequence by means of a sequential list of assembly-language instructions that access the memory (which is extracted from this code sequence), and of the memory addresses that are accessed, as illustrated in FIG. 3.

This memory access pattern P is supplemented by statistical characteristics computed from this list, and non-exhaustively in particular by:

a memory intensity Im representative of the number of read access instructions R or write access instructions W versus the total number of instructions;

a read/read-write ratio or read/memory ratio Rwr representative of the number of read access instructions R versus the number of memory access instructions (read and write). The expression "number of memory accesses" will be used below to refer to the number of read-write accesses;

a Shannon entropy E of the memory access pattern P, representative of the random aspect of the memory addresses accessed; and interleaving Iv of the read access instructions R and write access instructions W.

The document "Improving Prediction Accuracy of Memory Interferences for Multicore Platforms", by C. Courtaud et al, hal-02401625, details these statistical characteristics and demonstrates their relevance to characterization of the sensitivity of software to contention.

SUMMARY OF THE INVENTION

One aim of the invention is to overcome the aforementioned problems, and in particular to provide a solution allowing automatic and rapid generation of assembly-language code sequences that are:

executable error-free (i.e. without execution stopping as a result of a software exception);

have memory access patterns P with varied and chosen characteristics, and that are therefore in principle:

aggressive to a greater or lesser extent (generating more or less memory contention);

sensitive to a greater or lesser extent (experiencing more or less contention).

Another aim of the invention is to use these assembly-language code sequences to construct:

a database of several thousand stubs with known memory access patterns the aggressiveness and sensitivity of which are measured (this database may be used to train—by machine learning—a model capable of estimating the aggressiveness and sensitivity of memory access patterns extracted from real critical embedded applications); and stubs with the characterized memory access patterns allowing the aggressiveness and sensitivity of competing embedded applications to be simulated with a view to carrying out WCET performance tests for a given embedded application.

According to one aspect of the invention, a method is provided for iteratively generating automatically a sequence of Nmax instructions in assembly language, the sequence being executable error-free by a multi-core processor, the method comprising steps of:

initializing registers of the processor, then selecting a first instruction of the predetermined sequence, optionally at random; and selecting, provided that N<Nmax, an $N+1^{th}$ instruction among an instruction to read from a memory connected to the cores of the processor by a memory bus, an instruction to write to said memory, and a local instruction using only the registers of the processors, according to rules and to priorities between said rules, said rules using respective differences between statistical-metric values of statistical metrics of a memory access pattern of a sequence of N previous instructions having statistical-metric values, and setpoint values; the rules comprising a first test rule if memory intensity is greater than a memory-intensity setpoint, in which case the $N+1^{th}$ instruction selected is a local instruction, and otherwise, the $N+1^{th}$ instruction selected is a read access instruction or a write access instruction.

In one embodiment, the statistical metrics of the memory access pattern of the sequence of N previous instructions comprise:

a memory intensity corresponding to the ratio of the number of read access instructions or write access instructions to the total number of instructions N;

a read/memory ratio corresponding to the ratio of read access instructions to memory access instructions (read and write); and a Shannon entropy E of the memory access pattern, representative of the random aspect of the memory addresses accessed.

According to one embodiment, the statistical metrics of the memory access pattern of the sequence of N previous instructions further comprise an interleaving of the read access instructions and of the write access instructions.

According to one embodiment, the rules comprise rules applied after the first rule, in any order:

a second test rule if the read/memory ratio is greater than a read/memory-ratio setpoint, in which case the $N+1^{th}$ instruction selected is a read access instruction, and otherwise, the N+1$^{th}$ instruction selected is a write access instruction;

a third test rule if the Shannon entropy E of the memory access pattern is greater than a Shannon-entropy setpoint, in which case the memory address of the N+1$^{th}$ instruction is selected so as to reduce the entropy E, through employment of an address already in use or an address the distance of which from the previous one is already known, and otherwise, the memory address of the N+1$^{th}$ instruction is selected at random; and a fourth test rule if the interleaving is greater than an interleaving setpoint, in which case the N+1$^{th}$ instruction selected is a read access instruction or a write access instruction of the same type as the N$^{th}$ instruction, and otherwise, the N+1$^{th}$ instruction selected is a read access instruction or a write access instruction of opposite type to that of the N$^{th}$ instruction.

In one embodiment, the method further comprises integrating the sequence of Nmax instructions in assembly language into an execution loop to generate executable software or a stub.

BRIEF DESCRIPTION OF THE DRAWINGS

The invention will be better understood on studying a few embodiments that are described by way of completely non-limiting example and illustrated by the appended drawings, in which.

In all the figures, elements designated by identical references are similar.

DETAILED DESCRIPTION

Figure 1:
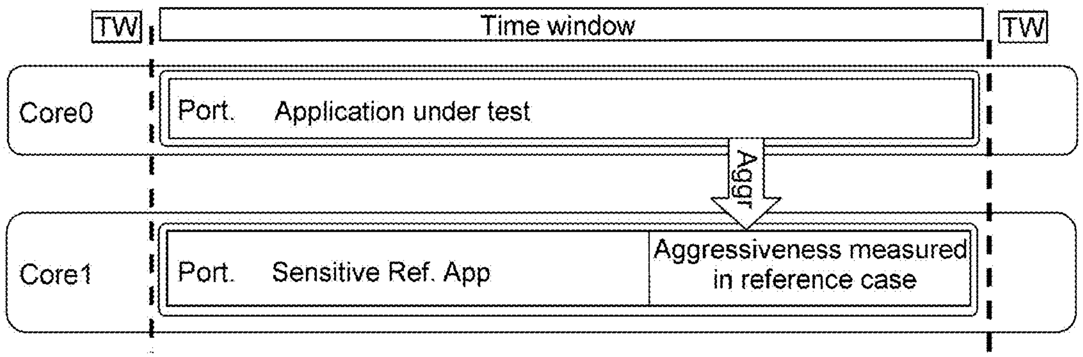
FIG. 1 schematically illustrates the aggressiveness of an assembly-language code sequence, according to the prior art.
Figure 2:
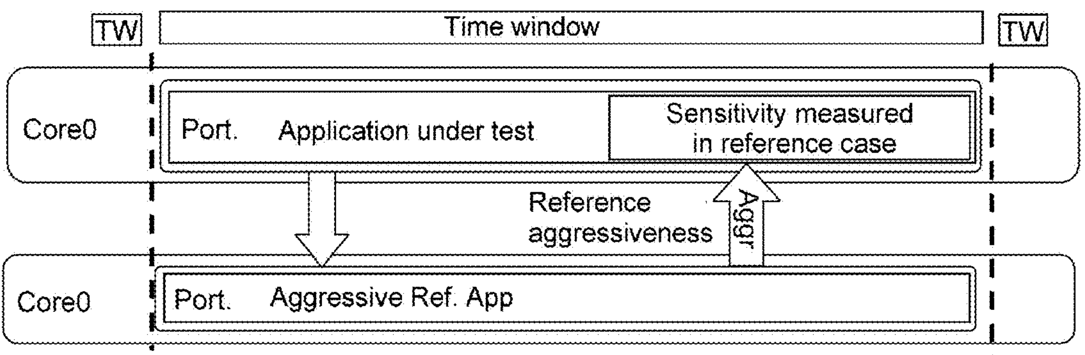
FIG. 2 schematically illustrates the sensitivity of an assembly-language code sequence, according to the prior art.
Figure 3:
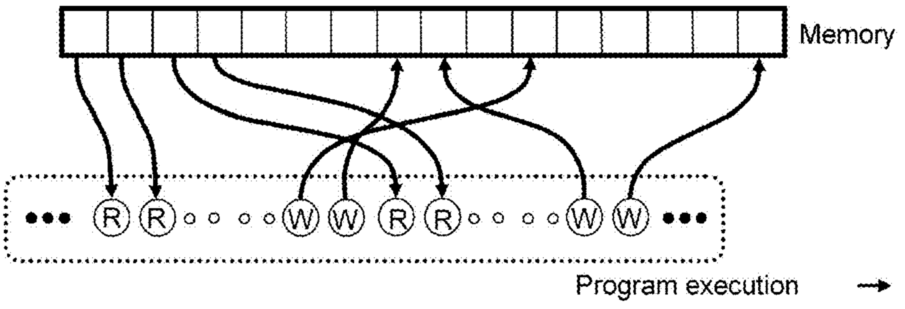
FIG. 3 schematically illustrates a sequential list of assembly-language instructions accessing the memory (which is extracted from this code sequence), and the memory addresses that are accessed in a memory access pattern, according to the prior art.
Figure 4:
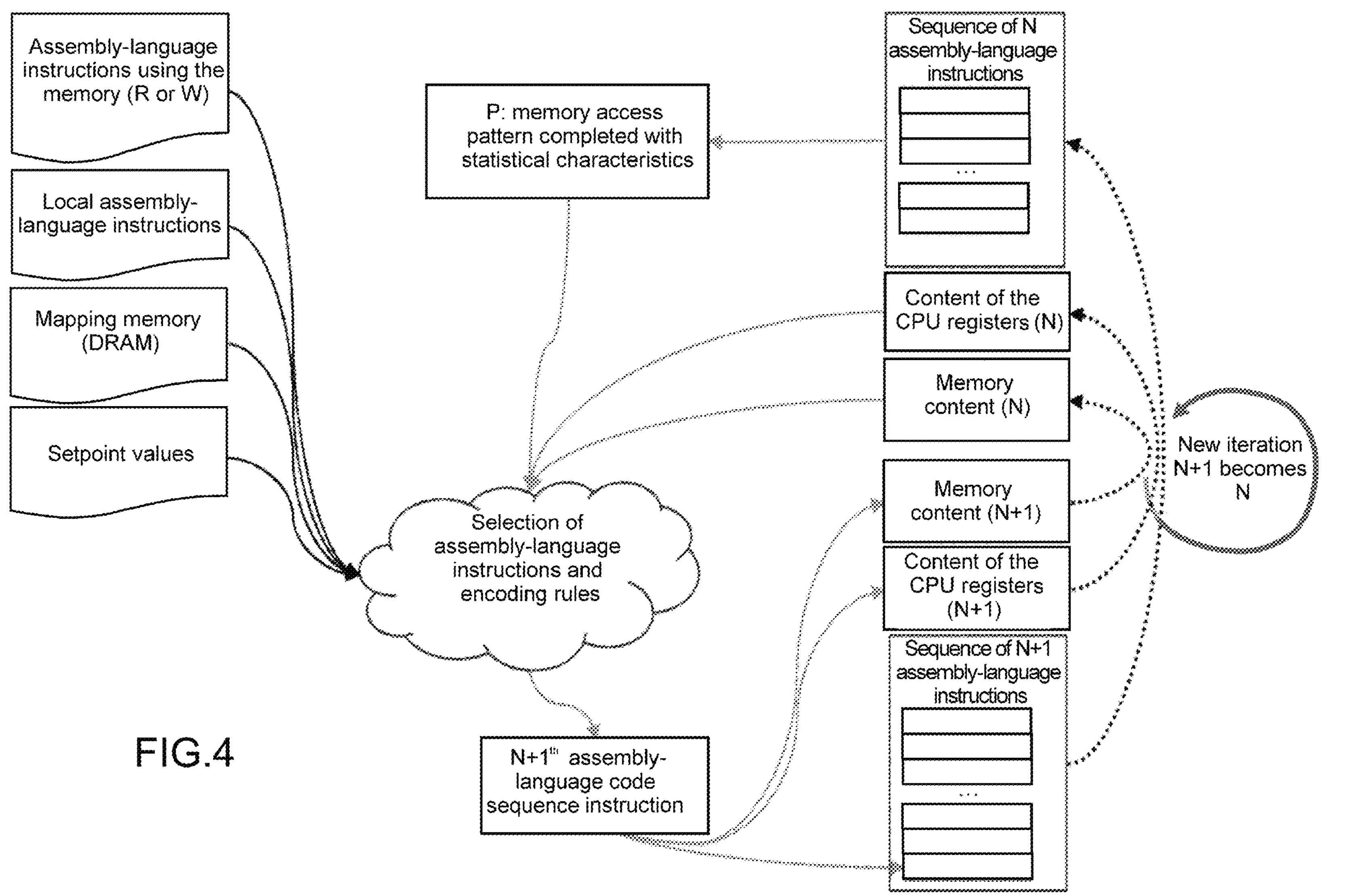
FIG. 4 schematically illustrates a method for automatically generating a sequence of Nmax instructions in assembly language, the sequence being executable error-free by a multi-core processor, according to one aspect of the invention.

As illustrated in FIG. 4, the invention provide a method for automatically generating a sequence of Nmax instructions in assembly language, the sequence being executable error-free by a multi-core processor, the method comprising steps of:

initializing registers of the processor, then selecting a first instruction of the predetermined sequence, optionally at random; and selecting an N+1th instruction among an instruction to read from a memory connected to the cores of the processor by a memory bus, an instruction to write to said memory, and a local instruction using only the registers of the processors, according to rules and to priorities between said rules, said rules using respective differences between statistical-metric values of statistical metrics of a memory access pattern P of the sequence of N previous instructions having statistical-metric values, and setpoint values.

The statistical metrics of the memory access pattern of the sequence of N previous instructions comprise:

a memory intensity Im corresponding to the ratio of the number of read access instructions R or write access instructions W to the total number of instructions N;

a read/memory ratio Rwr corresponding to the ratio of read access instructions R to memory access instructions (read R and W write); and a Shannon entropy E of the memory access pattern P, representative of the random aspect of the memory addresses accessed.

The statistical metrics of the memory access pattern of the sequence of N previous instructions may further comprise an interleaving Iv of the read access instructions R and of the write access instructions W.

Figure 5:
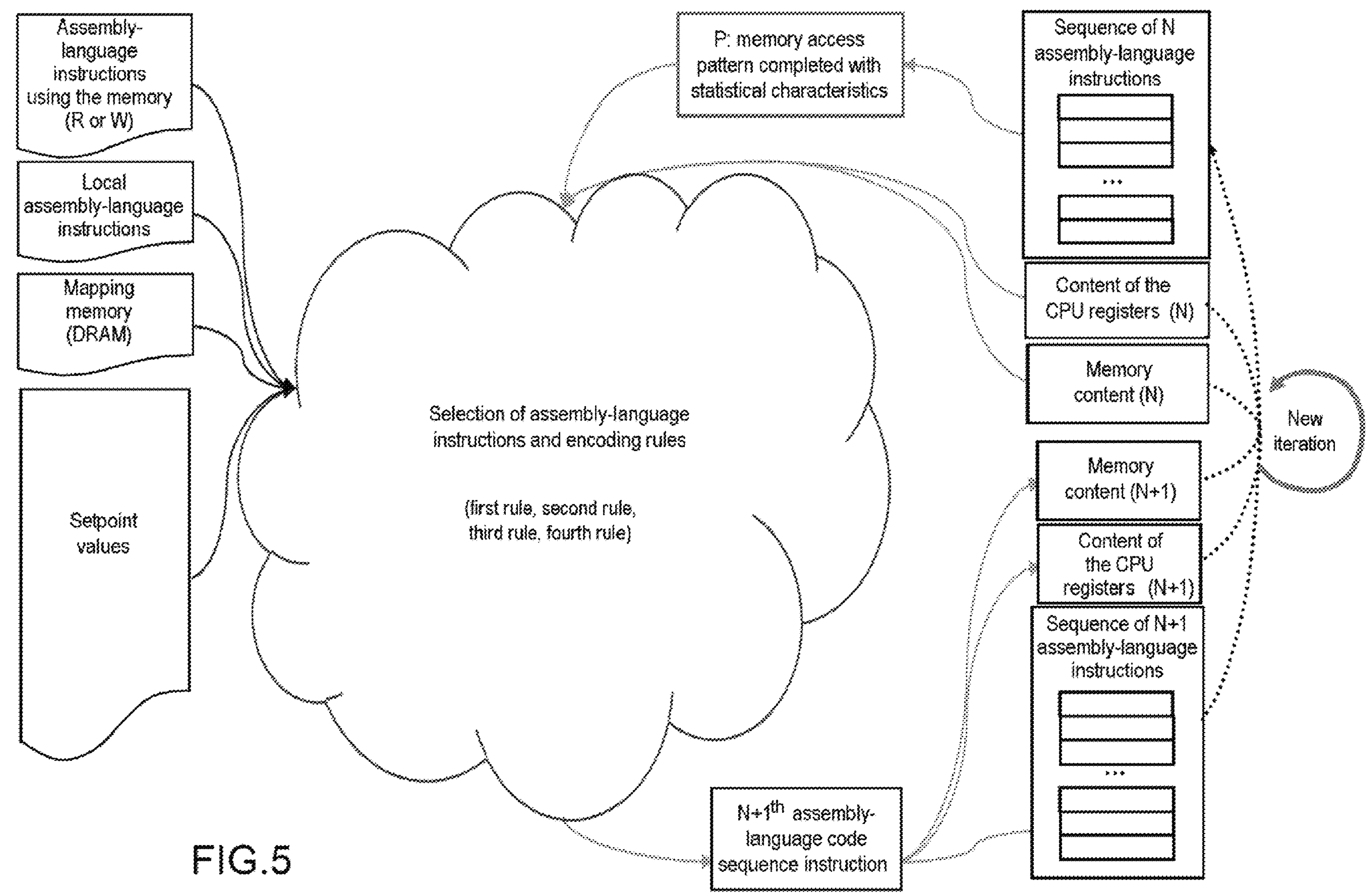
FIG. 5 schematically illustrates one example of instruction selection rules of the method of FIG. 4, according to one aspect of the invention.

FIG. 5 shows one example of instruction selection rules.

The rules comprise a first test rule if memory intensity Im is greater than a memory-intensity setpoint Im_c, in which case the N+1$^{th}$ instruction selected is a local instruction, and otherwise, the N+1$^{th}$ instruction selected is a read access instruction R or a write access instruction W.

The rules comprise rules applied after the first rule, in any order:

a second test rule if the read/memory ratio Rwr is greater than a read/memory-ratio setpoint Rwr_c, in which case the N+1$^{th}$ instruction selected is a read access instruction R, and otherwise, the N+1$^{th}$ instruction selected is a write access instruction W;

a third test rule if the Shannon entropy Ep of the memory access pattern P is greater than a Shannon-entropy setpoint Ep_c, in which case the memory address of the N+1$^{th}$ instruction is selected so as to reduce the entropy E, through employment of an address already in use or an address the distance of which from the previous one is already known, and otherwise, the memory address of the N+1$^{th}$ instruction is selected at random; and a fourth test rule if the interleaving Iv is greater than an interleaving setpoint Iv_c, in which case the N+1$^{th}$ instruction selected is a read access instruction R or a write access instruction W of the same type as the N$^{th}$ instruction, and otherwise, the N+1$^{th}$ instruction selected is a read access instruction R or a write access instruction W of opposite type to that of the N$^{th}$ instruction.

As a variant, other metrics may be envisaged, and other rules defined as a function thereof to influence the instructions selected, registers used, and memory addresses targeted.

The method further comprises integrating the sequence of Nmax instructions in assembly language into an execution loop to generate executable software or a stub.

Figure 6:
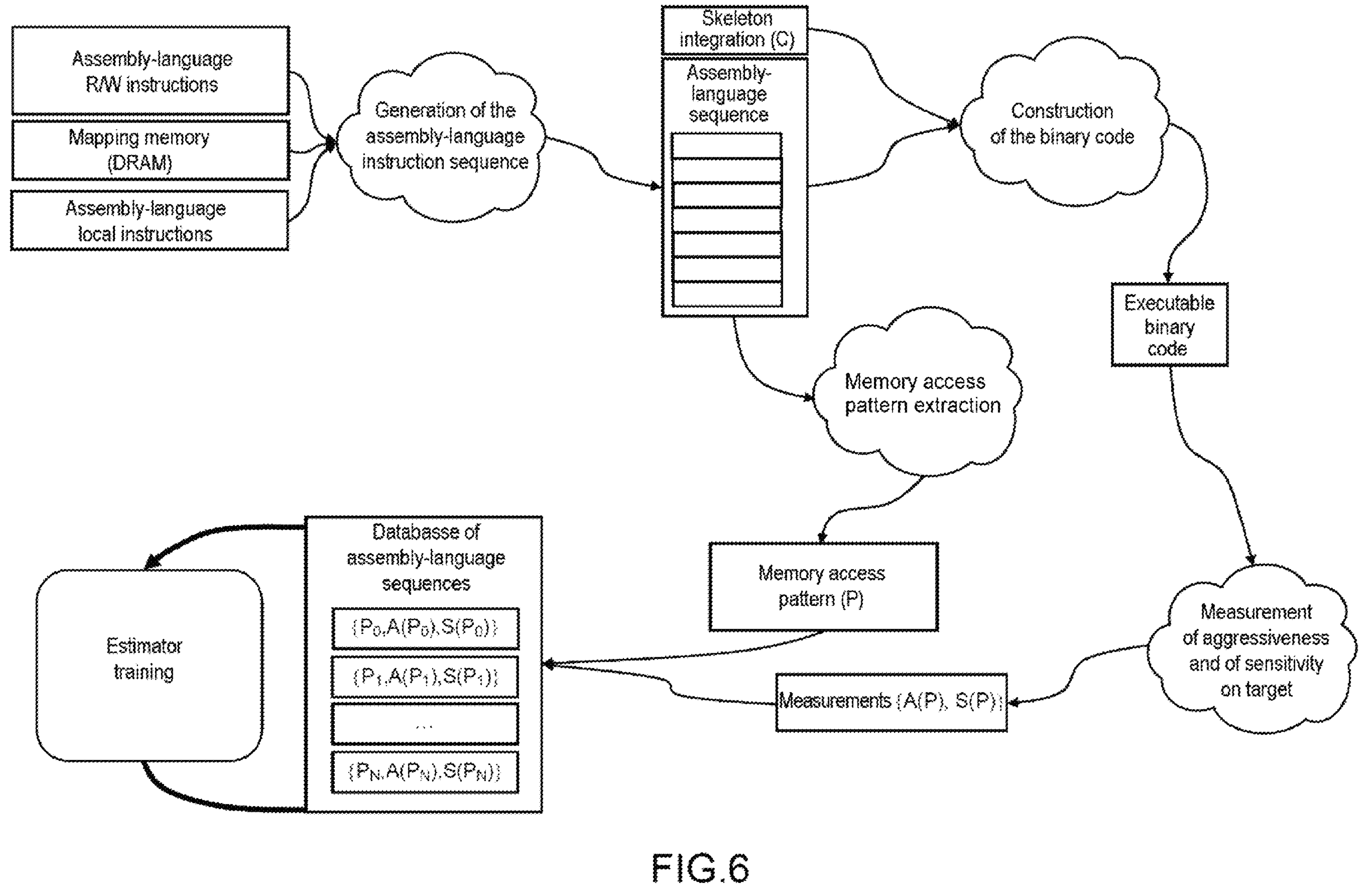
FIG. 6 schematically illustrates automation of the process for selecting assembly-language instructions with a view to rapidly constructing sequences, according to one aspect of the invention.

The invention allows, as illustrated in FIG. 6, the process of selecting assembly-language instructions to be automated with a view to rapidly constructing sequences:

of variable size, and which potentially are very long (thousands of instructions), that are consistent and guarantee on-target execution (no execution errors), and that have memory access patterns close to the selected target values or setpoints.

In addition, automation makes it possible to rapidly generate multiple sequences, with various memory access patterns (depending on the multiple target values selected), and therefore to construct a training database suitable for machine learning, by carrying out the following steps:

generation of the assembly-language instruction sequence according to the principles described above;

integration into a skeleton C and construction of the binary code;

measurement of aggressiveness A and of sensitivity S on target;

retrieval of the memory access pattern and of the associated metrics; and capitalization on the sequences, memory access patterns and measurements to form a training database;

an additional step may consist in using the training database for supervised training of an estimator of sensitivity and aggressiveness (machine learning).

The invention claimed is:

1. A method for iteratively generating automatically a sequence of Nmax instructions in assembly language, the sequence of Nmax instructions being executable error-free by a multi-core processor, the method comprising steps of:

initializing registers of a multi-core processor, then selecting a first instruction of a predetermined sequence or at random;

selecting after the first instruction, provided that N<Nmax, an N+1th instruction among instructions to read from a memory connected to cores of the multi-core processor by a memory bus, an instruction to write to said memory, and a local instruction using only the registers of the multi-core processor and the selecting being according to rules and to priorities between said rules; and integrating the N+1$^{th}$ instruction in the sequence of Nmax instructions in assembly language into an execution loop to generate executable software or a stub, wherein said rules using respective differences between statistical-metric values of statistical metrics of a memory access pattern (P) of a sequence of N previous instructions having statistical-metric values, and setpoint values; and wherein the rules comprising a first test rule, if a memory intensity (Im) is greater than a memory-intensity setpoint (Im_c), then the N+1$^{th}$ instruction selected is a local instruction, and otherwise, the N+1$^{th}$ instruction selected is a read access instruction (R) or a write access instruction (W).

2. The method according to claim 1, wherein the statistical metrics of the memory access pattern of the sequence of N previous instructions comprise:

a memory intensity (Im) corresponding to a ratio of a number of read access instructions (R) or write access instructions (W) to a total number of instructions N;

a read/memory ratio (Rwr) corresponding to the ratio of the read access instructions (R) to memory access instructions (R, W); and an access Shannon entropy (E) of the memory access pattern (P), representative of a random aspect of memory addresses accessed.

3. The method according to claim 2, wherein the statistical metrics of the memory access pattern of the sequence of N previous instructions further comprise an interleaving (Iv) of the read access instructions (R) and of the write access instructions (W).

4. The method according to claim 1, wherein the rules comprise rules applied after the first test rule, in any order:

a second test rule, if a read/memory ratio (Rwr) is greater than a read/memory-ratio setpoint (Rwr_c), then the N+1$^{th}$ instruction selected is a read access instruction (R), and otherwise, the N+1$^{th}$ instruction selected is a write access instruction (W);

a third test rule, if a Shannon entropy (Ep) of the memory access pattern (P) is greater than a Shannon-entropy setpoint (Ep_c), then a memory address of the N+1$^{th}$ instruction is selected so as to reduce an entropy E, through an address already in use or an address that is already known, and otherwise, the memory address of the N+1$^{th}$ instruction is selected at random; and a fourth test rule, if an interleaving (Iv) is greater than an interleaving setpoint (Iv_c), then the N+1$^{th}$ instruction selected is a read access instruction (R) or a write access instruction (W) of a same access type as the N$^{th}$ instruction, and otherwise, the N+1$^{th}$ instruction selected is a read access instruction (R) or a write access instruction (W) opposite to an access type of the N$^{th}$ instruction.

5. The method according to claim 1 wherein selection of the N+1$^{th}$ instruction is performed based on current contents of processor registers and memory content updated after execution of the N$^{th}$ instruction.

6. The method according to claim 1 wherein the rules are configured to prevent execution exceptions arising from invalid register usage or invalid memory addressing.

7. The method according to claim 1 further comprising integrating a generated instruction sequence into an execution loop executed on the multi-core processor to evaluate memory bus contention behavior.

8. The method according to claim 1 wherein the statistical metrics correspond to contention behavior on a shared memory bus arbitrated among processor cores.

* * * * *